United States Patent [19]
Rhyner et al.

[11] Patent Number: 4,656,541
[45] Date of Patent: Apr. 7, 1987

[54] FRONT LOADING CARTRIDGE ACTIVATED CLAMP AND EJECT MECHANISM

[75] Inventors: Michael J. Rhyner; Walter L. Auyer, both of Ft. Collins, Colo.

[73] Assignee: Hewlett-Packard Company, Palo Alto, Calif.

[21] Appl. No.: 690,807

[22] Filed: Jan. 11, 1985

[51] Int. Cl.⁴ .............. G11B 5/008; G11B 15/00; G11B 17/00
[52] U.S. Cl. .................................... 360/96.5
[58] Field of Search ............ 360/93, 96.5, 96.6, 360/132

[56] References Cited

U.S. PATENT DOCUMENTS

| | | | |
|---|---|---|---|
| 3,957,225 | 5/1976 | Vogel | 360/96.5 |
| 4,208,681 | 6/1980 | Hatchett | 360/93 |
| 4,227,224 | 10/1980 | Umezawa et al. | 360/96.5 |
| 4,285,020 | 8/1981 | Sato | 360/132 |
| 4,335,409 | 6/1982 | Yokota et al. | 360/96.6 |
| 4,509,087 | 4/1985 | Jäger et al. | 360/132 |
| 4,533,969 | 8/1985 | Miyashita et al. | 360/132 |

FOREIGN PATENT DOCUMENTS 2090457A 7/1982 United Kingdom .............. 360/93

*Primary Examiner*—Robert S. Tupper
*Assistant Examiner*—Melissa J. Koval
*Attorney, Agent, or Firm*—Bloor Redding, Jr.

[57] ABSTRACT

A manual, front loading, cartridge activated clamp and eject mechanism for a magnetic tape cartridge is disclosed which conforms with ANSI X3.55-1977 Standard for positioning the tape cartridge. The mechanism combines the clamp and eject functions and has two stable states, an ejected and clamped states. In the ejected state, a cartridge may be removed from or inserted into the drive mechanism. The mechanism automatically moves into the clamped state when a cartridge is inserted into the mechanism and manually pushed to approximately 1.5 mm of its final position. An eject button is provided to move the mechanism from the clamped state to the ejected state and to eject the cartridge.

4 Claims, 7 Drawing Figures

FRONT LOADING CARTRIDGE ACTIVATED CLAMP AND EJECT MECHANISM

BACKGROUND

Magnetic tape drives are generally of the reel to reel type or the tape cartridge type. Magnetic tape cartridge types of magnetic tape drives are becoming a popular backup means for winchester disc drives because of their ease of use and low cost. For magnetic tape cartridge drives to work reliably, the tape cartridge must be accurately held in position by a clamp and eject mechanism.

The primary function of the clamp and eject mechanism is to accept the tape cartridge from a user and to accurately position the tape cartridge in the tape drive. In order to correctly read the information located on the magnetic tape in the cartridge, the cartridge must be positioned with respect to the base of the cartridge. Incorrect positioning leads to read errors and unreliable operation. The clamp and eject mechanism may be activated either by the presence of the cartridge in the mechanism or by other means. The cartridge may be loaded into the clamp and eject mechanism either with the front of the cartridge first, hence front loading, or with the end of the cartridge first, hence end loading.

Quarter inch tape cartridges are typically positioned by the clamp and eject mechanism according to the American National Standards Specification X3.55-1977 For Magnetic Tape Cartridges. According to this standard, the cartridge is positioned with reference to the top of the base of the tape cartridge using a force applied at 45 degrees to the lower front edges of two notches located on each side of the cartridge base. Because of the high variability of tolerances associated with the manufacture of the tape cartridges, it is important that the clamp mechanism properly position both sides of the cartridge in order to prevent errors in locating the information on the magnetic tape. Some prior art drive devices have incorporated an individual dual latching reference mechanism. When these cartridge activated latching mechanisms are used, it is possible for the cartridge to be positioned incorrectly. This occurs when one side of the independent dual latching mechanism latches without the other side of the mechanism latching.

Eject mechanisms used in prior art magnetic tape cartridge drives typically operated independently of the latching mechanism. These eject mechanisms operated by overriding the force associated with the latching mechanism and hence were sometimes difficult for a user to operate. Also many of the prior art eject mechanisms may eject the cartridge while the tape drive is still operating causing undesirable loss of data.

A need exists for a relatively simple combined latch and eject mechanism which guarantees the proper positioning of the cartridge yet is low in cost and reliable.

SUMMARY

In accordance with the preferred embodiment of the present invention, an apparatus is provided for clamping a quarter inch magnetic tape cartridge into and ejecting a quarter inch magnetic tape cartridge from a magnetic tape drive. This manual, front loading, cartridge activated clamp and eject mechanism conforms with the ANSI X3.55-1977 standard for positioning the tape cartridge base with respect to the drive. During the final 1.5 millimeters of travel into the drive, the magnetic tape cartridge simultaneously trips two latching arms which in turn releases two free floating clamp wheels to apply a force at 45 degrees against the forward edges of two notches in the base of the magnetic tape cartridge. This force propels the cartridge forward and upward into the reference position established in conformance with the ANSI standard for the drive. This accurately and securely positions the tape cartridge relative to the frame of the drive.

The present invention is superior to the prior art in two ways. First, the same mechanism is used to clamp and eject the magnetic tape cartridge. This results in a simpler, less expensive and easier to operate mechanism than was available in the prior art. Second, the mechanism offers improved registration. Several reasons exist for the improved registration. First, tolerance buildup is reduced because the reference position is derived from the drive frame. Second, the mechanism is not capable of latching one side of the cartridge without also latching the other side of the cartridge. Finally, rather than relying on the user to force the cartridge into the reference position, the clamp and eject mechanism pulls the cartridge into the mechanism during the last few millimeters of travel thereby assuring the cartridge is firmly seated in the reference position.

DESCRIPTION OF THE PREFERRED EMBODIMENT

Figure 1:
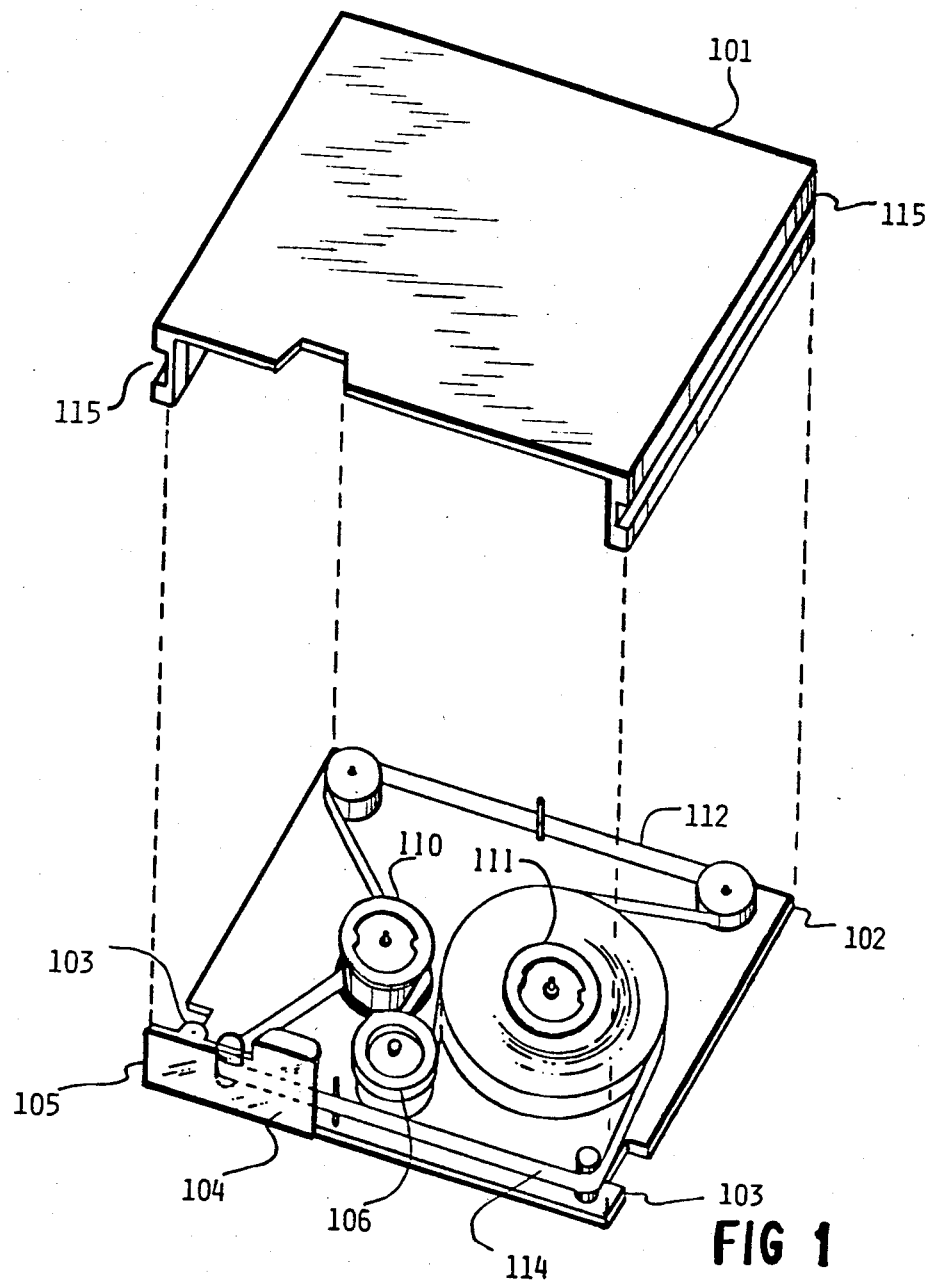
FIG. 1 is a pictorial diagram of a typical magnetic tape cartridge that may be employed with the clamp and eject mechanism of the present invention.

FIG. 1 is a pictorial diagram of a magnetic tape cartridge employed with the magnetic tape drive of the present invention. All components are mounted on a base 102. Two tape spools 110 and 111 hold magnetic tape 114. An elastic band 112, which turns the spools 110 and 111 to move the magnetic tape 114 from one spool to the other spool, is driven by a hub 106. A raised section at the top of the hub 106 contacts a tape drive motor for driving the band 112. The base 102 contains two notches 103 located on each side of the cartridge. The cartridge is protected by a cover 101 except where a hinged door 104 permits access to the magnetic tape 114. The edges of the base 102 guide the cartridge in and out of the drive. End 105 of door 104 blocks the channel 115 on the side of the cartridge adjacent door 104. When the cartridge is inserted into the drive, two guides on each side of the drive accept the channels 115 in the cartridge and place pressure on the end 105 of the door 104 causing the door 104 to swing open. This action automatically exposes the magnetic tape 114 and permits the magnetic tape 114 to contact the magnetic heads located in the drive mechanism.

Figure 2:
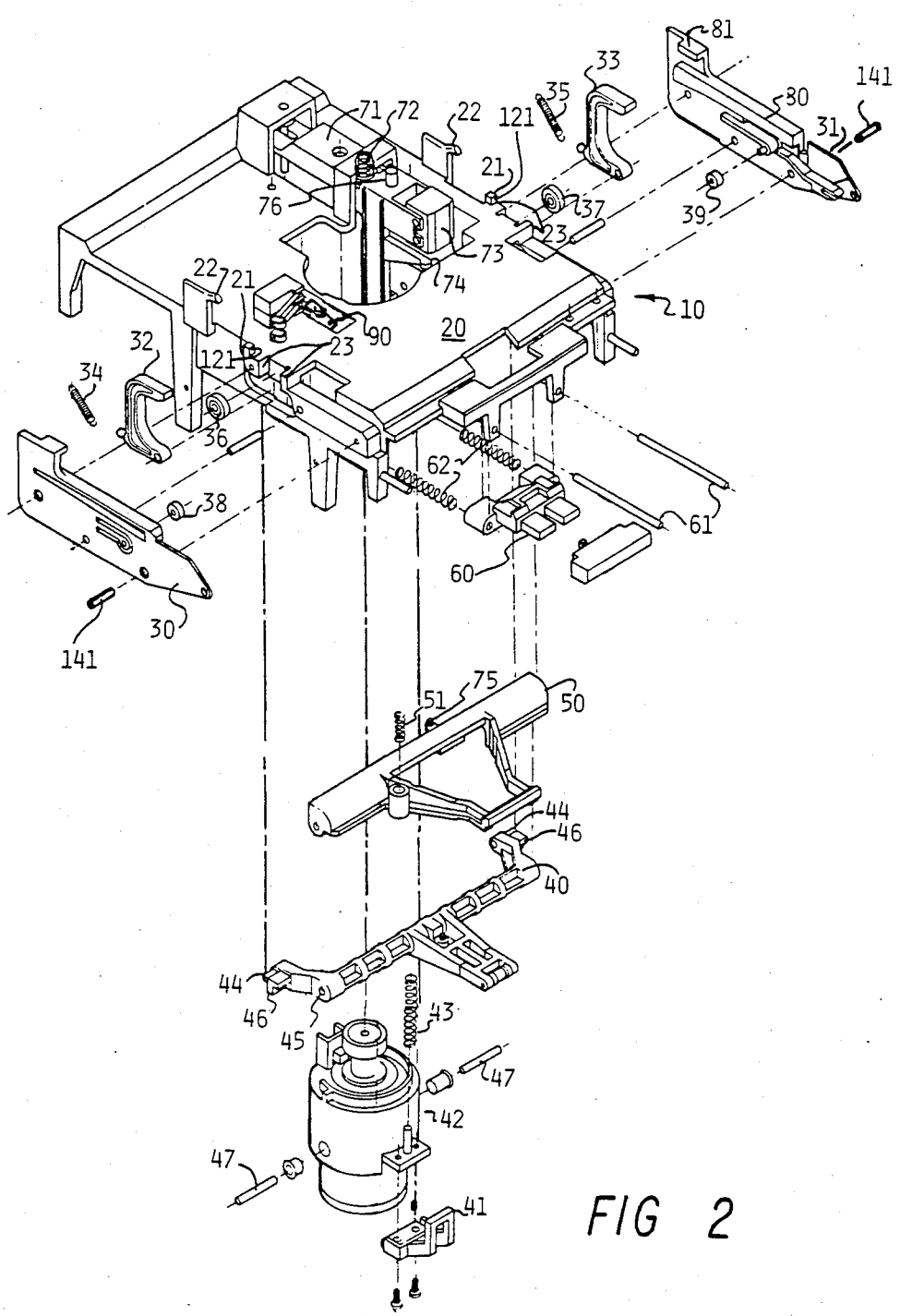
FIG. 2 is an exploded view of a magnetic tape drive having a clamp and eject mechanism constructed in accordance with the preferred embodiment of the present invention.

FIG. 2 shows an exploded view of the magnetic tape drive 10 having a clamp and eject mechanism constructed in accordance with the preferred embodiment of the present invention. The drive comprises a frame 20 having two sets of reference surfaces 21 and 121, two walls 23, and two spring mounts 22 with one member of each pair located on opposite sides of the frame. The frame 20 is typically cast, including the reference surfaces 21 and 121 thus assuring their exact position and shape with respect to the frame 20. The front of base 102 of the cartridge comes directly into contact with the reference surfaces 121 to assure the proper horizontal position of the tape cartridge. Located on opposite sides of the frame are sides 30 and 31. The sides are typically made of plastic and provide a guide 80 and a stop 81. When inserted into the drive, the sides of base 102 of the cartridge ride on the bottom side of guide 80. The guide 80 rides in channel 115 and opens the cartridge door 104 to expose the tape 114 to a magnetic head 73. The bottom of guide 80 resting on the top of reference surface 21 serves as the vertical reference for the top of the cartridge base 102. Together the reference surface 121 and the guide 80, which is positioned with respect to reference surface 21, establish a registered position. A pair of wheels 38 and 39 help the cartridge base 102 slide more easily into and out of the drive and provide stabilization for the back of the cartridge.

The clamp and eject mechanism comprises seven parts: a lever 40, two arms 32 and 33, two springs 34 and 35, and two floating clamp wheels 36 and 37. The lever 40 has a socket 45, a shoulder 46, and a post 44. The cartridge is ejected from the drive by a push button assembly. The push button assembly comprises a button 60, guides 61 and springs 62. The button 60 has a sloped surface which supplies an upward force on the lever 40, when the button is pushed in toward the drive. The clamp and eject mechanism may be locked by a locking mechanism comprising of a lever 50, spring 51 and trigger 75. The tape cartridge is driven by a motor 42. The motor 42 is mounted to the frame 20 by pins 47 and held against the cartridge drive hub 106 by a spring 43. The motor 42 is coupled to the lever 40 by a member 41. The magnetic head 73 is mounted on a platform 71 having a reference arm 74. The platform 71 moves up and down along a guide 76 and against a spring 72.

The lever 40 is connected to the frame 20 with two pins 141. The pin runs through frame 20 into the socket 45, thereby permitting the lever 40 to pivot freely around socket 45. In order to prevent the arms 32 and 33 from independently latching one side of the cartridge without the other arm latching the other side of the cartridge, the arms are coupled together by lever 40. The arms 32 and 33 are pivotally mounted to the ends of the lever 40 at the posts 44. The free floating clamp wheels 36 and 37 are located in a pocket bounded by the sides 30 and 31 on the outside, the guide 80 of sides 30 and 31 on the top, the frame 20 on the inside, the wall 23 of frame 20 on the front and back, and the shoulders 46 at each end of lever 40 on the bottom.

The button 60 is mounted to the frame 20 on guides 61 and is held away from the lever 40 by the springs 62. When the lock is used, the lever 50 is mounted to the frame 20 on the same pins 141 as lever 40 and pivots around the same point. The lever 50 is biased against the button 60 by the spring 51 located between the lever 50 and the frame 20.

Figure 3:
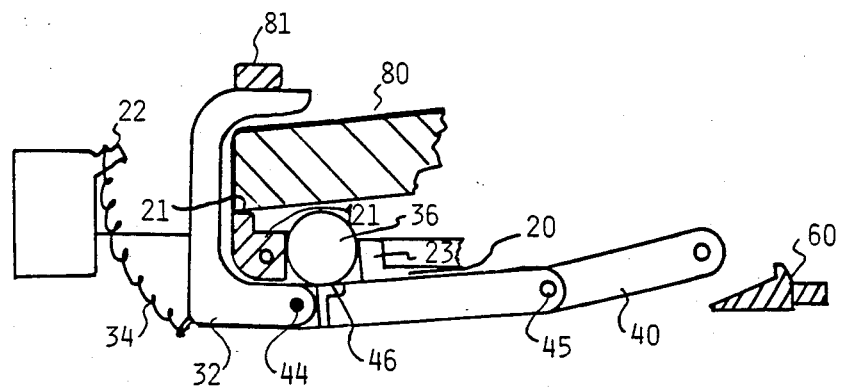
FIG. 3 is a fragmentary elevation view of the magnetic tape drive of FIG. 2 illustrating the position of the components of the clamp and eject mechanism following ejection of the tape cartridge.
Figure 4:
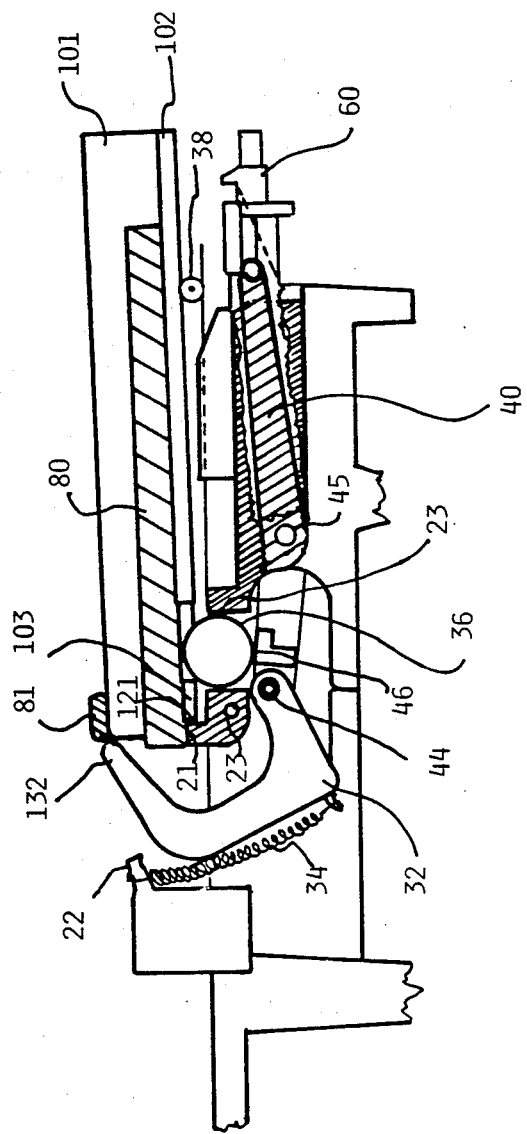
FIG. 4 is a fragmentary elevation view of the magnetic tape drive of FIG. 2 with the tape cartridge held in the clamped position.

The method of operation of the clamp and eject mechanism is described as follows. The clamp and eject mechanism has two stable states, an eject state illustrated in FIG. 3 and a clamped state illustrated in FIG. 4. FIGS. 3 and 4 illustrate the operation of the clamp and eject mechanism. FIG. 3 is a fragmentary elevation view of the magnetic tape drive of FIG. 2 with the magnetic tape cartridge ejected and the side 30 partially cut away to expose the clamp and eject mechanism. FIG. 3 illustrates one side of the clamp and eject mechanism and the following description is with respect to that side except as indicated. The end of lever 40, which contacts the button 60 in a clamped state, is swung away from the button 60 in the ejected state. The free floating clamp wheel 36 is resting against the shoulder 46 at the lower end of the pocket, hence the clamp wheel 36 is away from the guide 80 and out of the way of the cartridge to be inserted. In the ejected state, the arm 32 is in its lowest position and is driven against the guide 80 by the spring 34. In the ejected state, the arm 32 is restrained at the top by the stop 81.

FIG. 4 is a fragmentary elevation view of the magnetic tape drive of FIG. 2 with the magnetic tape cartridge clamped in the registered position. As in FIG. 3, the side 30 has been partially cut away to expose the clamp and eject mechanism. When the cartridge is inserted into the drive 10, the cartridge cover 101 pushes back the arm 32. When the cartridge is approximately 1.5 mm from the registered position, the top 132 of the arm 32 passes by the stop 81 and the spring 34 causes the top 132 of the arm 32 to slide up and come to rest on stop 81. Both arms must be pressed back free of stop 81 by the cartridge at the same time before the arm 32 and the lever 40 can pivot up. By requiring both arms to be pushed clear of the stop 81, the clamp and eject mechanism prevents one side of the cartridge from engaging while the other side remains unlocked. As the lever 40 moves up, the shoulder 46 pushes the free floating clamp wheel 36 up into the cartridge notch 103 which propels the cartridge forward into the registered position. The pressure from the wheel is applied at 45 degrees to the bottom front of the notch 103 in cartridge base 102 as required by the ANSI standard. The 45 degree force pushes the top of the cartridge base 102 forward the remaining 1.5 millimeters and drives the cartridge horizontally into the reference surface 121 and vertically into the guide 80. In the clamped state, the arm 32 is in a raised position, and the front of the lever 40 comes to rest against the sloped surface of button 60.

To eject the cartridge, the button 60 is pushed in toward the frame 20. As the button 60 is pushed toward the frame, the sloped portion of the button 60 pushes up lever 40 which pivots around socket 45. As the lever 40 moves up, the arm 32 begins to drop, and the shoulder 46 is lowered. The lowered shoulder 46 causes the free floating clamp wheel 36 to drop into the pocket, thereby releasing the cartridge base 102. When the top 132 of arm 32 drops below the stop 81, the arm 32 pivots about post 44 and top 132 pushes on cartridge cover 101 and ejects the cartridge. When the mechanism is in the ejected state shown in FIG. 3, the cartridge is ejected approximately 12 millimeters out of the front of the drive device where the user can easily grasp the cartridge and remove it to a storage location elsewhere.

Figure 5:
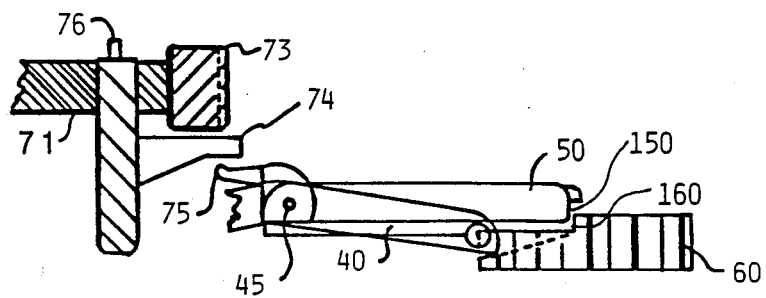
FIG. 5 is a fragmentary elevation view of the magnetic tape drive of FIG. 2 with the locking mechanism in the locked position.
Figure 6:
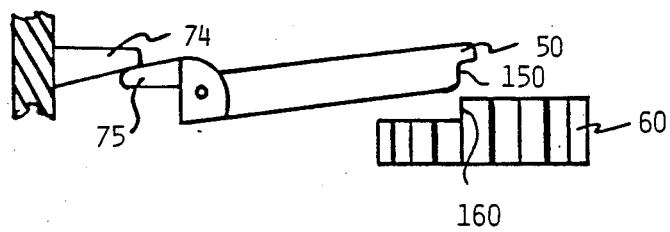
FIG. 6 is a fragmentary elevation view of the magnetic tape drive of FIG. 2 with the locking mechanism in the unlocked position.

To insure that the cartridge is not ejected when the magnetic head 73 is in a raised read or write position, the clamp and eject mechanism may be locked by the locking mechanism. FIG. 5 and FIG. 6 illustrate the operation of the mechanism. FIG. 5 shows the mechanism in a locked position. FIGS. 6 and 2 show the mechanism in an unlocked position. As shown in FIG. 6, the magnetic head 73 and its platform 71 are in a lowest or home position. The reference arm 74 is forced against the trigger 75 of lever 50 by spring 72. This pressure causes the lever 50 to pivot around the pin 141, the corner 150 to clear notch 160 and to disengage from the button 60. When disengaged, the button 60 is free to slide forward and if a cartridge is present, apply force to the end of lever 40 to eject the cartridge as described above. This is also the position of the lever 50 when the cartridge is inserted. Once the drive has been activated, the head 73 is moved up to align with the magnetic tape in the cartridge. When this occurs, as shown in FIG. 5, the reference arm 74 raises above the trigger 75 of lever 50. Spring 51 forces the lever 50 to drop and come into contact with the button 60. The lever 50 engages the button 60 in such a manner as to lock the top of the button 60, corner 150 obstructs notch 160 and prevents the button from being pushed in by the user. This prevents the cartridge from being ejected. The button 60 is locked any time the head is not in the home position. When the drive is finished performing an operation, the head is moved to the home position and the cartridge can then be removed.

Proper positioning can be further improved by preventing the motor 42 from pushing against the cartridge until the cartridge is properly positioned. In order to drive the cartridge, the motor 42 must be firmly seated against the top of hub 106. This is typically accomplished by a spring mounted in such a manner as to push the drive portion of the tape drive motor against the top of the hub 106 of the tape cartridge. In the preferred embodiment of the present invention, this is accomplished by a spring 43 which forces the pivotally mounted motor 42 against the hub 106. However, in the prior art the additional pressure from the spring 43 increases the force required to push the cartridge into the drive and may prevent the cartridge from properly seating. This is especially true when the user begins to eject the cartridge but then decides to leave it in the drive mechanism. These partial ejection problems may be avoided by preventing the motor from pushing against the hub 106 until the cartridge has been properly reseated. This is accomplished in the preferred embodiment of the present invention by the member 41. The member 41 is mounted on the motor 42 and is coupled to the lever 40. When the user begins to eject the cartridge via button 60, the lever 40, through the member 41 pulls the motor away from the tape cartridge hub 106. If the user decides not to eject the cartridge and releases button 60, the cartridge will return to the registered position and the motor pushes against hub 106. When the tape cartridge has been inserted and the mechanism begins to latch, lever 40 moves to the clamped state and the lever 40 no longer pulls on the motor 42. The spring 43 then pushes the motor 42 against the top of hub 106.

Figure 7:
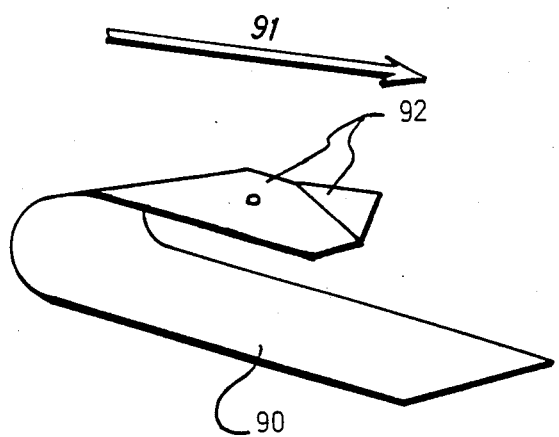
FIG. 7 is a pictorial diagram of the grounding strap employed with the clamp and eject mechanism illustrated in FIG. 7.

The base 102 of the cartridge is typically made of anodized aluminum and must be properly grounded to eliminate noise which might be picked up by the base and coupled into the magnetic head or support circuitry. Since all the parts in direct contact with the cartridge, except the reference surface 121, may be made of plastic, a grounding strap 90 is used to grounding the cartridge. FIG. 7 is a pictorial diagram of the grounding strap 90. The grounding strap 90 is securely attached to the frame 20 at the back of the clamp and eject mechanism as shown in FIG. 2. The top of the grounding strap 90 comes into contact with the front of the tape cartridge base 102 when the cartridge is in the registered position. The side 92 of the top of the grounding strap 90 cut through the anodized aluminum base 102 when the cartridge is pushed by the clamp and eject mechanism in the direction of arrow 91 into the registered position. By cutting through the anodized aluminum, the grounding strap 90 assures a good grounding connection for the cartridge base 102.

We claim:

1. An apparatus for positioning a magnetic tape cartridge in a magnetic tape drive device having a first and second stable state, the first state for ejecting a positioned tape cartridge when instructed by a force or accepting a tape cartridge to be positioned, the second state for clamping the tape cartridge into a registered position, the tape cartridge having a first and second side opposite to each other, a base used to reference the magnetic tape, and at right angles to the first and second side a third side where the magnetic tape of the tape cartridge is exposed, the apparatus comprising:

a frame having a reference surface to establish the registered position for the base of the tape cartridge;

first guiding means attached to the frame for guiding the first side of the tape cartridge into the registered position;

second guiding means attached to the frame for guiding the second side of the tape cartridge into the registered position;

first detection means supported by the first guiding means and contacting the cartridge for in the first state detecting when the first side of the cartridge is approximately in the registered position and for transmitting an ejecting force to the third side of the tape cartridge to eject the tape cartridge from the magnetic tape drive device;

second detection means supported by the second guiding means and contacting the cartridge for in the first state detecting when the second side of the cartridge is approximately in the registered position and for transmitting an ejecting force to the third side of the tape cartridge to eject the tape cartridge from the magnetic tape drive device;

positioning means pivotally mounted to the frame and movably connected to the first detection means and the second detection means for coupling the first detection means to the second detection means whereby the first and second detection means both must detect a tape cartridge prior to moving to the second state and for moving the first and second detection means from the second state into the first state when instructed by the force on the positioning means;

first biasing means connected to the first detection means for biasing the first detection means to seek the second state when a tape cartridge has been detected by the first detection means and for supplying the ejecting force to the first detection means when the apparatus is in the first state;

second biasing means connected to the second detection means for biasing the second detection means to seek the second state when a tape cartridge has been detected by the second detection means and for supplying the ejecting force to the second detection means when the apparatus is in the first state;

first clamping means located between the first guiding means and the frame and contacting the positioning means for clamping the first side of the base of the tape cartridge into the registered position when the apparatus is in the second state; and second clamping means located between the second guiding means and the frame and contacting the positioning means for clamping the second side of the base of the tape cartridge into the registered position when the apparatus is in the second state.

2. An apparatus as in claim 1, further comprising:

translating means slidably mounted to the frame and contacting the positioning means for translating a force parallel to and toward the frame into the force necessary to cause the positioning means to move from the second state to the first state.

3. An apparatus as in claim 2, further comprising:

a platform including a magnetic head;

second positioning means mounted perpendicularly to the frame for moving the platform parallel to the frame, said means having a first position representing a fixed distance between the frame and the platform and a range of second positions at varying distances between the frame and the platform; and head position detecting means movably attached to the frame for detecting by contacting the platform when the platform is in the first position and blocking the translating means from supplying the force to change the state of the apparatus.

4. An apparatus as in claim 3, further comprising:

a motor pivotally mounted to the frame having a drive wheel for driving the tape cartridge;

motor biasing means for biasing the drive wheel toward the tape cartridge when the tape cartridge is in the registered position; and coupling means attached to the motor means and contacting the positioning means for overriding the motor biasing means whereby the drive wheel is prevented from contacting the tape cartridge until the apparatus is in the second state.

* * * * *